Amos Rank, Joel Sharp & Henry King.

STOCK-CAR.

4498

REISSUED AUG 1 1871

Witnesses:-
W. H. Rowe,
Joel Peyton.

Inventor:-
Amos Rank
Joel Sharp
Henry King
by their Atty
W. D. Bell

UNITED STATES PATENT OFFICE.

AMOS RANK, HENRY KING, AND JOEL SHARP, OF SALEM, OHIO, ASSIGNORS TO THE NATIONAL CATTLE-CAR COMPANY, OF SAME PLACE.

IMPROVEMENT IN STOCK-CARS.

Specification forming part of Letters Patent No. 111,873, dated February 14, 1871; reissue No. 4,498, dated August 1, 1871.

*To all whom it may concern:*

Be it known that we, AMOS RANK, HENRY KING, and JOEL SHARP, all of Salem, in the county of Columbiana and State of Ohio, have invented certain new and useful Improvements in Railway Stock-Cars, of which the following is a specification:

The object of our invention is to supply stock with water without stopping or unloading while being transported in railway cars; and the improvement herein claimed consists: First, in combining a reservoir arranged beneath the car with watering-troughs arranged above the reservoir. Second, in combining a reservoir located below the drinking-troughs with an atmospheric pump to force water into the troughs for the reservoir. Third, in combining water-troughs on each side of the car with a reservoir located below the troughs and connected with them on each side. Fourth, in combining a reservoir beneath the car, an atmospheric pump, and a pipe or hose connected with the bottom of the reservoir.

In the accompanying drawing our improvements are shown as applied to a stock-car invented by Amos Rank, of Salem, Ohio, and patented February 14, 1871. Obviously, however, these improvements might be adapted to any ordinary stock or freight-car.

Figure 1:
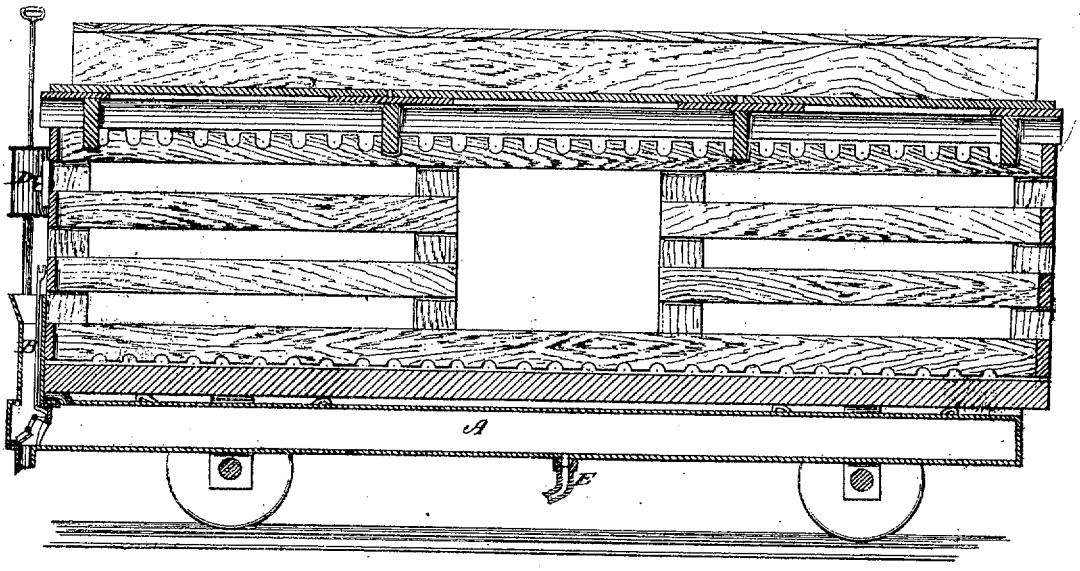
Figure 2:
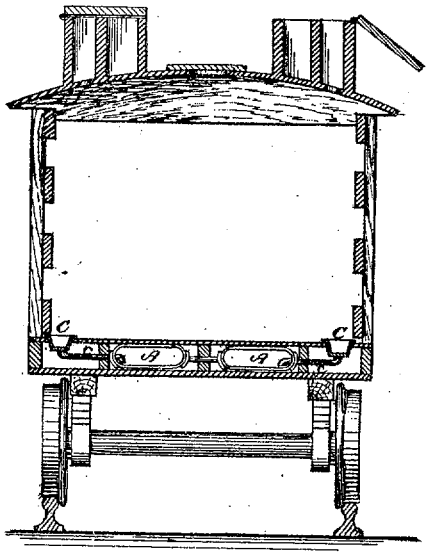

Figure 1 represents a longitudinal section, and Fig. 2 a vertical transverse section through our improved car.

The construction of the running gear and body of a stock-car is well known and needs no description here.

Beneath the body of the car we arrange an air-tight reservoir, A, of any suitable size, shape, construction, or material, but we, by preference, use long tubes or cylinders extending lengthwise of the car. This reservoir is filled at the watering-station through an inlet-pipe, B. Pipes *c* connect the reservoir with troughs C, arranged in or upon the floor of the car, and, where a middle deck is employed, upon its sides. Water is forced forced from the reservoir into these troughs by a suitable atmospheric pump, D, by means of which atmospheric pressure may be applied to the upper surface of the water in the reservoir to force the water into the troughs. This pressure being perfectly under the control of the attendant, so much water only as may be necessary is forced into the troughs. If more water is forced into the troughs than is needed by the stock it may be withdrawn into the reservoir simply by allowing the compressed air to escape from the reservoir, thus relieving the pressure upon the surface of the water. Waste of water is thus prevented, as well as its liability to freeze in an open trough.

We also attach a pipe or hose, E, to the bottom of the reservoir, where it serves many valuable purposes, as it is obvious that it may be used to empty or to fill the reservoir, to shower the stock, to cleanse the cars, or to cool hot boxes, or even to extinguish fires.

The hose is much simpler and less expensive than a showering-roof with a tank above it. Our reservoir, being beneath the car, is protected in a great measure from accident, and its weight lowers the center of gravity and renders the car less liable to upset than one having a tank in the roof. The water in the reservoir might be prevented from freezing by packing a non-conductor of heat around it, or by means of a coil of pipe connected with the boiler of the engine or with a stove in the car.

We, of course, contemplate the use of our invention on stock-cars provided with feed-troughs, feed-bins, removable stall-partitions, and other improvements now being introduced on this class of cars.

We are aware that atmospheric pressure heretofore has been employed to eject fluids from reservoirs in which they have been contained, into which they could flow back upon the pressure being relieved; and we do not, therefore, broadly claim an atmospheric pump. Neither do we broadly claim a tank on a stock-car. But we are not aware of any stock-car prior to our invention in which water is forced by an atmospheric pump from a reservoir below the car into drinking-troughs, from which it can flow back into the reservoir upon relieving the pressure thereon.

We claim as our invention—

1. In a stock-car, the combination of the reservoir arranged beneath the floor of the car with the watering-troughs arranged above the reservoir, substantially as hereinbefore set forth.

2. In a stock-car, the combination of a water-reservoir and a watering-trough arranged relatively to one another, as above mentioned, and an atmospheric pump for supplying water to the trough in regulated quantities while an excess of pressure is maintained on the surface of the water in the reservoir.

3. The combination, with a stock-car, of troughs arranged on each side of the car, a reservoir lolated below the troughs, and pipes connecting the troughs and reservoir, substantially as hereinbefore set forth.

4. The combination, with a stock-car, of the reservoir beneath the car, the atmospheric pump, and the pipe issuing from the bottom of the reservoir, as set forth.

AMOS RANK.
HENRY KING.
JOEL SHARP.

Witnesses:
THOMAS KENNETT,
PETER AMBLER.